Feb. 19, 1924.

L. GRELLA

VEHICLE FENDER

Filed July 31, 1923

Inventor:
Larie Grella.
By Frederick V. Winters,
Att'y.

Patented Feb. 19, 1924.

1,484,351

UNITED STATES PATENT OFFICE.

LARIE GRELLA, OF BROOKLYN, NEW YORK.

VEHICLE FENDER.

Application filed July 31, 1923. Serial No. 654,884.

*To all whom it may concern:*

Be it known that I, LARIE GRELLA, a citizen of the United States, residing at Brooklyn, in the county of Kings and State of New York, have invented certain new and useful Improvements in Vehicle Fenders, of which the following is a full, clear, and exact specification.

This invention relates to vehicle fenders and especially to life-saving baskets or catchers for use on automobiles, and is designed as an improvement on the structure disclosed in my Patent No. 1,453,272, issued May 1, 1923.

It is the object of the invention to provide improved means for supporting a fender or basket on the front of an automobile normally out of contact with the road, and for dropping the front edge of said basket or fender onto the ground when necessary for picking up a person who cannot avoid being struck. Another object is to arrange the means for supporting and dropping the catcher or basket so that said means will not interfere with the steering mechanism of certain makes of automobiles. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views.

Figure 1:
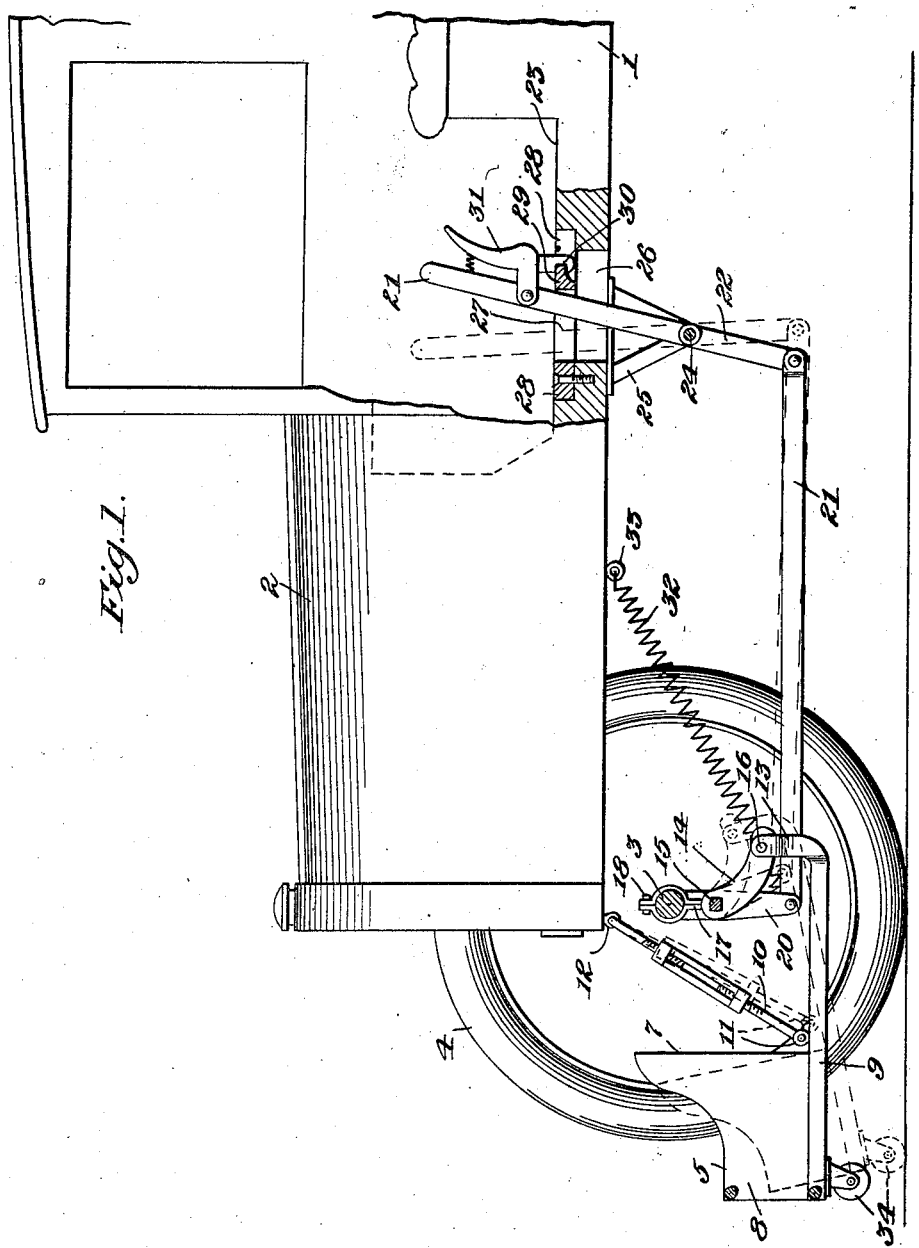
Figure 1 is a side elevation, partly in section, of the front end portion of an automobile equipped with a fender or life-saving basket constructed and attached substantially in accordance with this invention.

In the drawings 1 designates the body of an automobile, 2 the engine hood, 3 the front axle, and 4 the front or steering wheels of the machine. The basket or catcher 5 is preferably formed like a couch or seat with a bottom 6 and back 7 preferably of wire mesh material or rope, and ends of sheet metal, wood or other suitable material, as best shown at 8 in Figure 1. Said basket or seat 5 is mounted on the front end portions of a pair of parallel beams or bars 9 extending substantially parallel to the longitudinal axis of the automobile. Said bars 9 are supported at the front end of the automobile preferably by a pair of turnbuckle rods 10 which have their lower ends pivotally connected at 11 to said bars 9 in rear of the back of the seat 5. The upper ends of said turnbuckle rods 10 are pivotally connected at 12 to the frame of the automobile, so that the bars 9 are attached to swinging or oscillating supports, namely, the turnbuckle rods 10, the fulcrum points 11 of said bars being movable when said bars are rocked for raising or lowering the catcher or seat, as will be hereinafter more fully explained.

Said bars 9 constitute intermediately pivoted levers which are fulcrumed at 11 on the lower ends of the trunbuckle rods or swinging supports 10. The rear end portions of said bars 9 extend backward below and in rear of the front axle 3 of the automobile, where said bars have inwardly and upwardly bent extremities 13 which are forked at their ends to embrace, respectively, the lower ends of a pair of downwardly and rearwardly curved arms 14 mounted to swing with a rock shaft 15 suitably journaled below said front axle 3. Said forked ends 13 of the bars 9 are pivoted to said lower ends of the arms 14 by pivot pins 16 fixed to said arms.

The rock shaft 15 may be journaled in straps or hangers 17 secured to the front axle 3 in any suitable manner, as by the clamping bolts 18, which permits the attachment to be readily made to the automobile axle at any time. The rock shaft 15 also has fixed thereto two other arms 19 and 20, the former of which is pivoted to a connecting rod or link 21 extending rearwardly and also pivoted to a hand lever 22 reaching up through the floor 23 of the body 1 of the car. Said hand lever 22 is intermediately pivoted at 24 to hangers 25 secured to the under face of the floor 23, while the portion of the lever above said pivot extends up through a slot 26 in said floor and a slot 27 in a plate 28 fastened to the upper surface of the floor over the slot 26 therein. At the rear end of said slot 27 in the plate 28 there is a cross-bar 29, the rear edge of which is suitably shaped to be engaged by a notch or hook 30 as in the lower end of a spring-pressed latch or pawl 31 which is pivoted on the upper end portion of the hand lever 22. The arm 20 on the rock shaft has a coiled spring 32 attached thereto, said spring also being attached to the under face of the floor of the automobile, as at 33, and serving to accelerate the drop of the front edge of the catcher or basket 5 to the ground when the hook 30 on the pawl 31 is released from the cross-bar 29 of the floor plate 28, as indicated in dotted lines in Figure 1. When the lever 22 has its upper end drawn rearward and the hook 30 on the pawl 31 engaged with the cross-bar 29 of the plate 28, the basket or catcher 5 is raised to a position above the road, as shown in solid lines in Figure 1.

It will be observed that by reason of the upwardly bent rear end portions 13 of the bars 9, the catcher or basket 5 may be carried quite close to the road when in raised position, so that only a slight movement is necessary to drop said basket or catcher into position for use. The front edge of said catcher is equipped with wheels or rollers 34 for supporting the same on the road when in lowered or dropped position. Inasmuch as the pivot pins 16, which connect the extremities of the upwardly bent portions 13, of the bars 9, to the arms 14, on the rock shaft 15, are fixed with respect to said arms, the swinging of the latter for lowering or raising the catcher 5 will necessarily cause a swinging or oscillating movement of the turnbuckle rods 10, which further reduces the extent of movement necessary for the upper end of the hand lever 22 in effecting the dropping or raising of said catcher. This is evident from the dotted line position of the turnbuckle rod illustrated in Figure 1, the movement of said rod being downward, or toward the road, when the rear ends of the bars 9 are raised for dropping said catcher.

Figure 2:
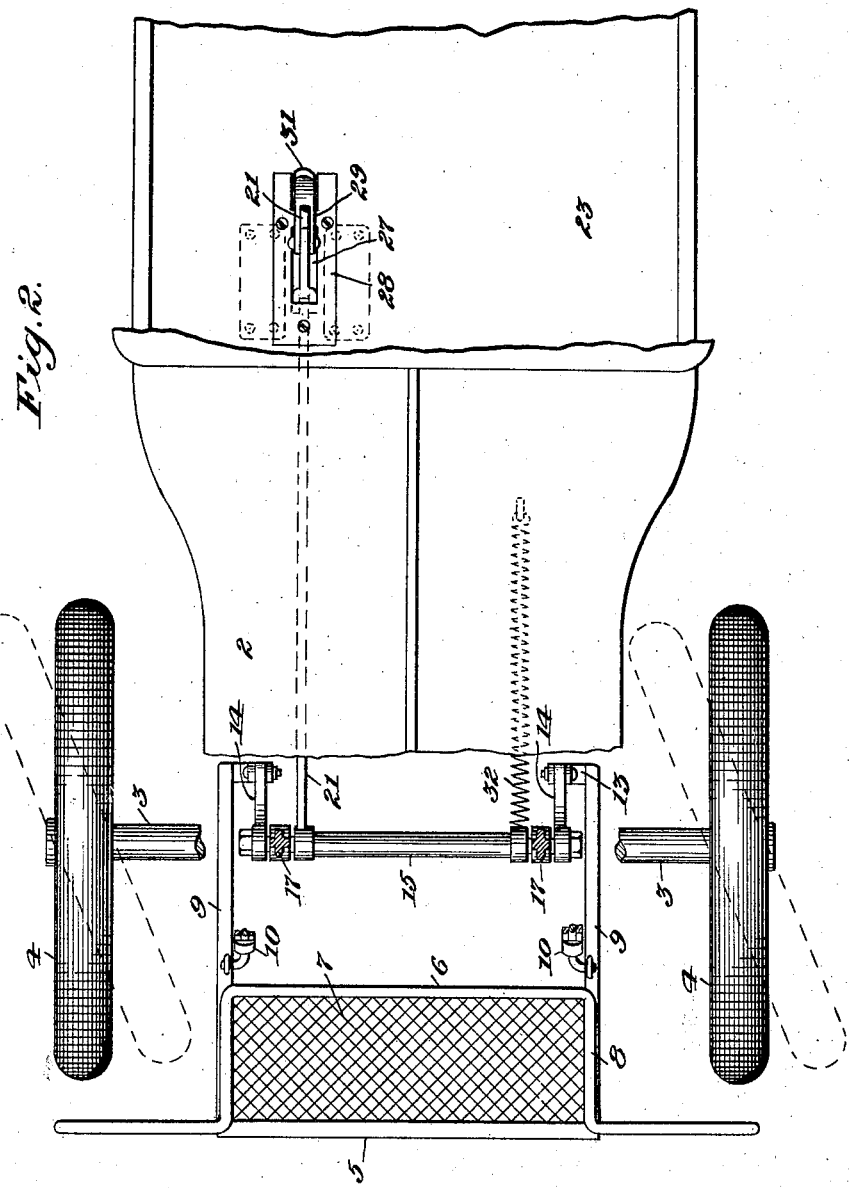
Figure 2 is a plan view of the same parts with certain portions broken away for the sake of clearness in illustrating other portions.
Figure 3:
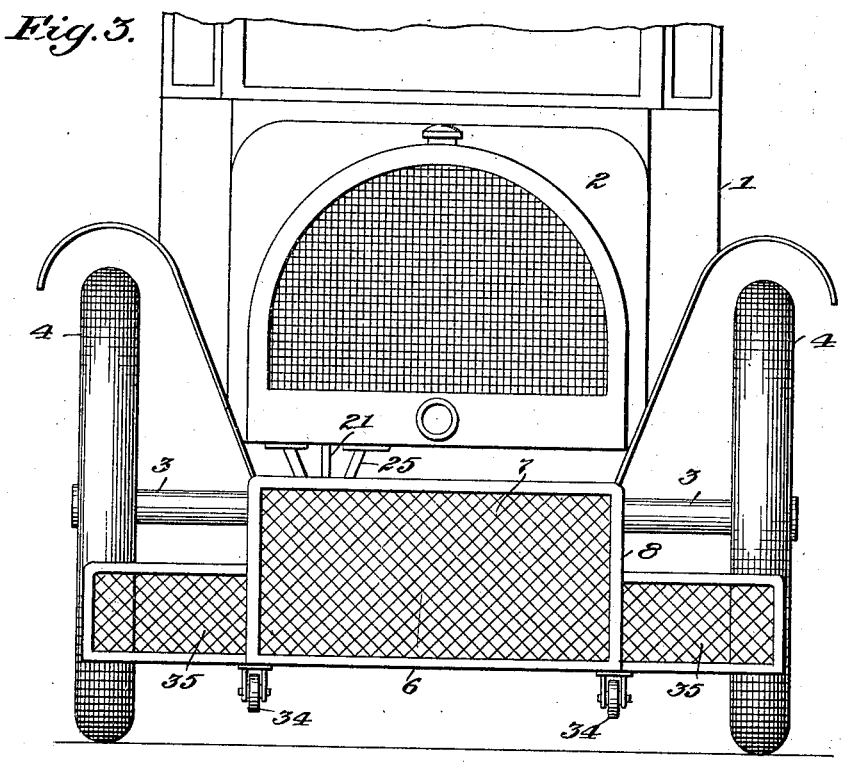
Figure 3 is a front elevation of the fender and automobile with part of the top of the latter broken away.
Figure 4:
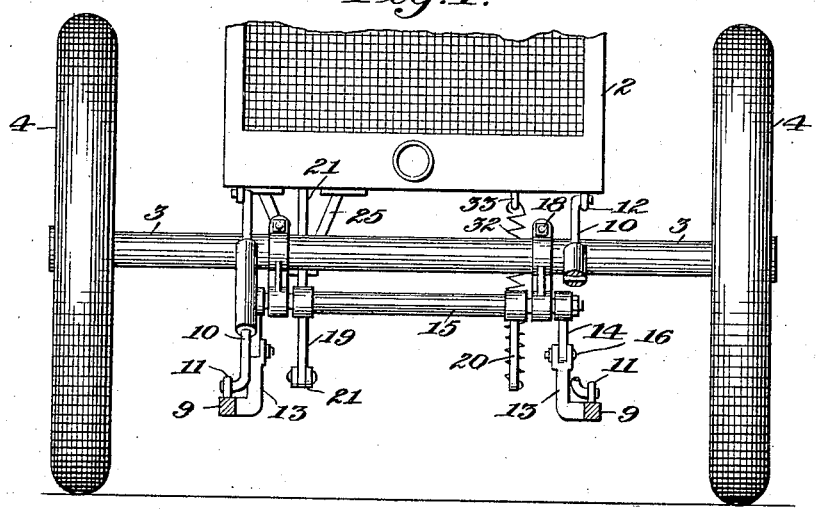
Figure 4 is a front elevation of the lower part of the front end of the automobile with the basket and lateral wings broken away to illustrate more clearly the other parts of the invention.

The catcher or basket 5 has lateral wings 35, preferably made like the bottom and back of said basket and extending in front of the wheels 4. As best shown in Figure 2, the ends 8 of the catcher or basket are spaced sufficiently from the wheels 4 to allow the latter to turn, as indicated in dotted lines, for steering the automobile, without coming in contact with said ends of the catcher. Said wings are rigidly attached to the basket and are dropped with its front edge, in line with which they are arranged, so as to prevent a person struck by the fender from being run over by the wheels.

I claim:

1. A fender for automobiles comprising longitudinal bars, a catcher on the outer end portions of said bars, a rock shaft, arms carried by said shaft and having fixed pivots connected to the inner end portions of said bars, supports pivoted to said bars at intermediate points thereof and adapted to swing when the rock shaft is actuated for raising or lowering the catcher, and means for rocking said shaft.

2. A fender for automobiles comprising longitudinal bars, a catcher on the outer end portions of said bars, a rock shaft, arms carried by said shaft and having fixed pivots connected to the inner end portions of said bars, longitudinally adjustable supports pivoted to said bars at intermediate points thereof and adapted to swing when the rock shaft is actuated for raising or lowering the catcher, and means for rocking said shaft.

3. A fender for automobiles comprising longitudinal bars, a catcher on the outer end portions of said bars, a rock shaft, arms carried by said shaft and having fixed pivots connected to the inner end portions of said bars, said inner end portion of the bars being bent upwardly from the main portions thereof, whereby said main portions of the bars and the catcher are normally carried close to the road, and means for rocking said shaft.

4. A fender for automobiles comprising longitudinal bars, a catcher on the outer end portions of said bars, a rock shaft, arms carried by said shaft and having fixed pivots connected to the inner end portions of said bars, supports pivoted to said bars at intermediate points thereof and adapted to swing when the rock shaft is actuated for raising or lowering the catcher, and means for locking said shaft in position for retaining the catcher raised.

5. A fender for automobiles comprising longitudinal bars, a catcher on the outer end portions of said bars, a rock shaft, arms carried by said shaft and having fixed pivots connected to the inner end portions of said bars, supports pivoted to said bars at intermediate points thereof and adapted to swing when the rock shaft is actuated for raising or lowering the catcher, a hand lever for actuating said rock shaft, a stationary plate having a slot through which said lever extends, a cross-bar on said plate, and a pawl mounted on said lever and having a notch adapted to engage said cross-bar for locking the rock shaft in position for retaining the catcher raised.

6. A fender for automobiles comprising intermediately pivoted longitudinal bars, a catcher on the outer end portions of said bars, a rock shaft operatively engaging the inner ends of said bars, whereby the catcher may be raised or lowered by rocking said shaft, a hand lever for rocking said shaft, a stationary plate having a slot through which said lever extends, a cross-bar on said plate, and a pawl carried by the lever and having a notch adapted to engage said cross-bar for locking the catcher in raised position.

7. A fender for automobiles comprising intermediately pivoted longitudinal bars, a catcher on the outer end portions of said bars, a rock shaft operatively engaging the inner ends of said bars, whereby the catcher may be raised or lowered by rocking said shaft, a hand lever for rocking said shaft, a stationary plate having a slot through which said lever extends, a cross-bar on said plate, a pawl carried by the lever and having a notch adapted to engage said cross-bar for locking the catcher in raised position, and means for automatically lowering the catcher when said pawl is released from said cross-bar.

8. A fender for automobiles comprising intermediately pivoted longitudinal bars, a catcher on the outer end portions of said bars, a rock shaft operatively engaging the inner ends of said bars, whereby the catcher may be raised or lowered by rocking said shaft, a hand lever for rocking said shaft, a stationary plate having a slot through which said lever extends, a cross-bar on said plate, a pawl carried by the lever and having a notch adapted to engage said cross-bar for locking the catcher in raised position, and a spring operatively connected to said rock shaft for automatically lowering said catcher when said pawl is released from said cross-bar.

In testimony whereof I have signed my name to this specification.

LARIE GRELLA.